United States Patent
Cakareski et al.

(10) Patent No.: US 7,860,005 B2
(45) Date of Patent: Dec. 28, 2010

(54) METHODS AND SYSTEMS THAT USE INFORMATION ABOUT A FRAME OF VIDEO DATA TO MAKE A DECISION ABOUT SENDING THE FRAME

(75) Inventors: Jakov Cakareski, Stanford, CA (US); John G. Apostolopoulos, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1592 days.

(21) Appl. No.: 10/970,974

(22) Filed: Oct. 22, 2004

(65) Prior Publication Data

US 2005/0169312 A1    Aug. 4, 2005

Related U.S. Application Data

(63) Continuation-in-part of application No. 10/769,327, filed on Jan. 30, 2004.

(51) Int. Cl.
*H04L 12/26* (2006.01)

(52) U.S. Cl. ..................... 370/235; 370/230

(58) Field of Classification Search ............... 370/229, 370/230, 235, 389, 392, 393, 394, 352, 353, 370/395.64, 465, 468, 470–474, 401, 404, 370/412, 428, 429, 462; 709/203, 208, 236, 709/237, 245, 246, 247, 232; 714/18, 248–252; 348/398.1, 410.1, 404.1, 425.3, 608
See application file for complete search history.

(56) References Cited

U.S. PATENT DOCUMENTS

| | | | | |
|---|---|---|---|---|
| 6,081,513 A | * | 6/2000 | Roy | 370/260 |
| 6,578,070 B1 | * | 6/2003 | Weaver et al. | 709/206 |
| 6,728,263 B2 | * | 4/2004 | Joy et al. | 370/468 |
| 6,747,991 B1 | * | 6/2004 | Hemy et al. | 370/468 |
| 6,898,204 B2 | * | 5/2005 | Trachewsky et al. | 370/445 |
| 6,975,655 B2 | * | 12/2005 | Fischer et al. | 370/516 |
| 7,388,853 B2 | * | 6/2008 | Ptasinski et al. | 370/338 |
| 7,424,058 B1 | * | 9/2008 | Staley et al. | 375/240.23 |
| 7,639,739 B2 | * | 12/2009 | Rose et al. | 375/240.01 |
| 2003/0204512 A1 | * | 10/2003 | Atarashi | 707/100 |
| 2004/0215807 A1 | * | 10/2004 | Pinder et al. | 709/232 |
| 2005/0025373 A1 | * | 2/2005 | Lee et al. | 382/243 |
| 2005/0169174 A1 | * | 8/2005 | Apostolopoulos et al. | 370/230 |

FOREIGN PATENT DOCUMENTS

| | | |
|---|---|---|
| DE | 10141553 | 4/2003 |
| WO | WO 02/098102 | 12/2002 |
| WO | WO 2005/076575 | 8/2005 |

OTHER PUBLICATIONS

D Mukherjee et al—"Structured Scalable Meta-Formats (SSM) for Digital Item Adaptation" —Proc of the SPIE vol. 5018—Jan. 22, 2003—pp. 148-167.
R Schaefer et al—"Improving Image Compression—Is It Worth The Effort?"—Proc of EUSIPCO vol. 2—Sep. 4, 2000—pp. 677-680.

* cited by examiner

*Primary Examiner*—Thai D Hoang

(57) ABSTRACT

Methods and systems thereof for streaming data are described. Information that quantifies a characteristic associated with a frame in a sequence comprising a plurality of frames of video data is accessed. The information is used to make a decision about the transmission of the frames, such as the order for sending the frames or whether or not to send a frame.

32 Claims, 10 Drawing Sheets

400

```
ACCESS DATA PACKETS THAT INCLUDE
FRAMES OF VIDEO DATA
410
          │
          ▼
ACCESS SCHEDULING CUES FOR
THE FRAMES
420
          │
          ▼
USE THE SCHEDULING CUES TO DETERMINE
WHICH OF THE FRAMES SHOULD BE
TRANSMITTED
430
```

FIG. 4

METHODS AND SYSTEMS THAT USE INFORMATION ABOUT A FRAME OF VIDEO DATA TO MAKE A DECISION ABOUT SENDING THE FRAME

CROSS REFERENCE TO RELATED APPLICATION

This Application is a Continuation-in-Part of the commonly-owned U.S. patent application, Ser. No. 10/769,327, filed Jan. 30, 2004, by J. G. Apostolopoulos et al., and entitled "Methods and Systems that Use Information About Data Packets to Determine an Order for Sending the Data Packets," and hereby incorporated by reference in its entirety

TECHNICAL FIELD

Embodiments of the present invention relate to the field of streaming media data.

BACKGROUND ART

Streaming media systems transmit media data, such as video and audio data, in data packets over wired and/or wireless networks. Due to constraints on available bandwidth, for example, some data packets transmitted over a network can experience delays along the way, perhaps arriving late at a destination node. Also, some data packets may be lost along the way.

The effects of late or lost data packets may be exacerbated for video data that are predictively encoded (compressed). Predictive encoding introduces dependencies in the encoded data that improve the amount of compression but can also result in error propagation in the event of data packet loss or late arrival.

Video frames are preferably received before their display (playback) times. With predictive encoding, the decoding of a frame of data may rely on the information in another frame, and therefore some frames need to be received earlier than their display time so that they can be used to decode other frames. For example, with MPEG (Moving Pictures Experts Group) encoding, a P-frame is predicted from a preceding P-frame or I-frame, and a B-frame is predicted from two P-frames or an I-frame and P-frame. This method of encoding is used in the MPEG-1/2/4 standards, the International Telecommunication Union (ITU) H.261/2/3/4 standards, and various non-standardized compression algorithms.

Encoded video frames that do not arrive or that arrive late at the decoder (e.g., a client or destination node) will not only miss their respective display deadlines, but they may also prevent a number of other, subsequent frames from being displayed properly. If, for example, a data packet constituting an I-frame or P-frame is lost, then it might not be possible to decode and display a subsequent P-frame or B-frame. In the case in which a P-frame cannot be decoded because a preceding I-frame or P-frame is absent, other subsequent frames dependent on that P-frame may not be decoded. Thus, a number of frames may be prevented from being properly decoded and displayed due to a single late or missing frame, depending on the particular coding dependencies of the late or missing frame. This can affect the overall quality of the display.

Video transcoding offers one solution that allows encoded data to be adapted to accommodate available bandwidth and packet losses. However, transcoding can be complex and thus may require significant computational effort.

Conventional MPEG encoding lends itself to a natural method of prioritizing data packets for delivery. For example, I-frames are considered to be of higher priority than P-frames, and P-frames are considered to be of higher priority than B-frames. Thus, information about frame type can be used to make a decision about which data packet(s) should or should not be discarded or dropped because of transmission constraints.

However, MPEG encoding or streaming generally treats all frames of a given frame type the same. For instance, all P-frames are treated as having equal importance. Consequently, in a situation that involves a sequence of only P-frames, for example, there is no basis for choosing which data packet(s) should or should not be discarded or dropped because of transmission constraints. In such a situation, data packets to be dropped/discarded are randomly selected, without regard to the effect on the quality of the decoded video.

DISCLOSURE OF THE INVENTION

Embodiments of the present invention pertain to methods and systems thereof for streaming data. Information that quantifies a characteristic associated with a frame in a sequence comprising a plurality of frames of video data is accessed. The information is used to make a decision about the transmission of the frames, such as the order for sending the frames or whether or not to send a frame.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a flowchart of a method for streaming media data according to one embodiment of the present invention.

Figure 1:
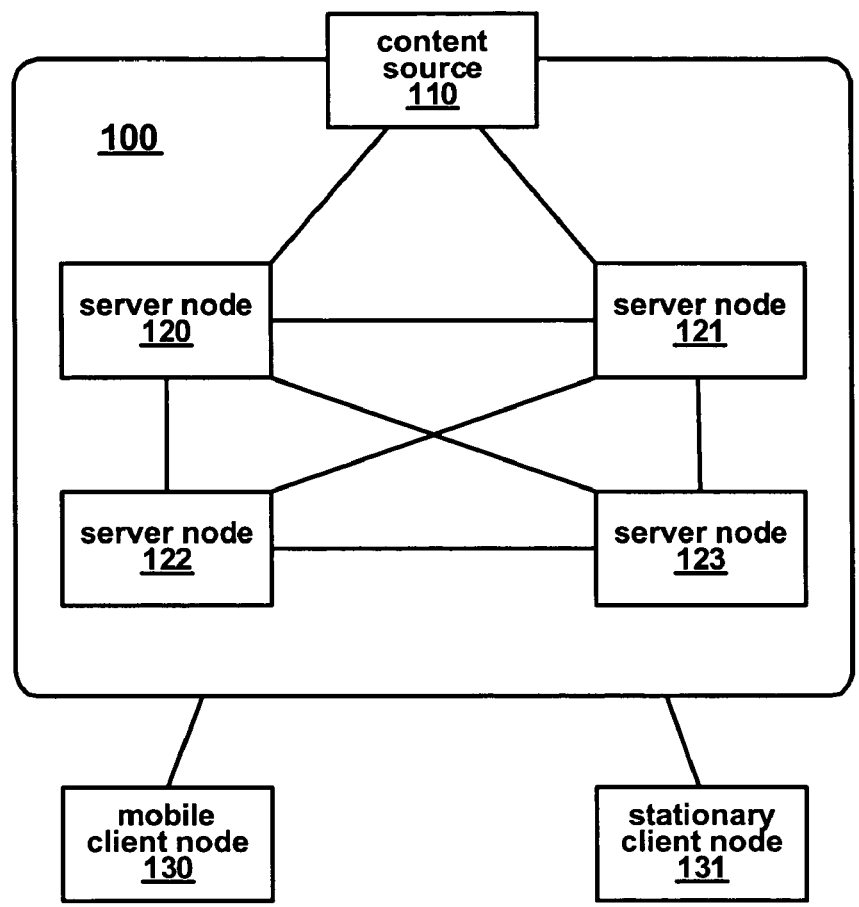
FIG. 1 is a representation of a network upon which embodiments of the present invention may be implemented.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The descriptions and examples provided herein are discussed in the context of multimedia data (also referred to herein as media data or media content). One example of multimedia data is video data accompanied by audio data; for example, a movie with soundtrack. However, media data can be video only, audio only, or both video and audio. In general, the present invention, in its various embodiments, is well-suited for use with speech-based data, audio-based data, image-based data, Web page-based data, graphic data and the like, and combinations thereof. Also, the present invention, in its various embodiments, is well-suited for use with data that may or may not be encoded (compressed) or transcoded. Furthermore, the data may or may not be encrypted.

In particular, embodiments of the present invention are described for video data, and in particular video data that are encoded using a predictive encoding technique such as that used in MPEG-1/2/4 and H.261/2/3/4 encoding. Because of the prediction and temporal dependencies introduced by such encoding techniques, predictively encoded video data introduce additional challenges relative to other types of data.

Also, embodiments of the present invention are discussed in the context of distortion, in particular with regard to distortion occurring in the display of a video object; however, the present invention is not so limited. With regard to video data, an objective of media streaming is to reduce or minimize distortion. "Reducing distortion" and "minimizing distortion" can be equivalently stated as "increasing quality." For video data, quality can be expressed in terms other than distortion. For types of data other than video data, quality can be expressed using many different terms known in the art.

The media data are typically separated into blocks of data. As video data, the blocks are typically referred to as frames. The data are streamed through a network as data packets. A data packet can include data for one or more frames, or the data constituting a frame may require more than one data packet. Data and data packets that are not encoded using a scalable encoder (sometimes called a layered or pyramid coder) can be referred to as "non-scalable data" and "non-scalable data packets," respectively, to emphasize that they are not designed so that the amount of data or the number of data packets can be reduced by simply dropping or discarding data or data packets. Therefore, the data and data packets are described as being non-scalable.

FIG. 1 is a representation of a network 100 upon which embodiments of the present invention may be implemented. In the present embodiment, network 100 includes a content source 110 coupled to a number of interconnected server nodes 120, 121, 122 and 123. There may of course be a greater or lesser number of content sources and server nodes than those illustrated.

The interconnections between these nodes, including content source 110, may be a wired connection, a wireless connection, or a combination thereof. Each interconnection includes one or more channels, so that multiple streaming sessions between nodes can take place in parallel.

Generally speaking, content source 110 and server nodes 120-123 are types of devices that provide the capability to process and store data, and to send and receive such data. Accordingly, server nodes 120-123 may be computer systems as well as other types of devices that may not be typically considered computer systems but have similar capabilities.

In communication with network 100 are client devices such as mobile client node 130 and stationary client node 131. In one embodiment, network 100 is for streaming media data to client nodes 130 and/or 131. There may be a greater or lesser number of client nodes than those illustrated. The client nodes 130 and 131 may be coupled to the network 100 via a wired connection, a wireless connection, or a combination thereof.

In general, network 100 provides the capability to provide data from content source 110, and/or from any of the intermediate server nodes 120-123, to the client nodes 130-131. The route, or path, taken by the data as it travels from the content source 110 to the client nodes 130-131 may pass through any number of intervening nodes and interconnections between those nodes. Generally speaking, embodiments of the present invention pertain to the streaming of data packets from a sender to a receiver. Any of the nodes in network 100 may be considered to be a sender, and similarly any of the nodes in network 100 may be considered to be a receiver. The sender and receiver nodes may be adjacent nodes, or they may be separated by intervening nodes.

Figure 2A:
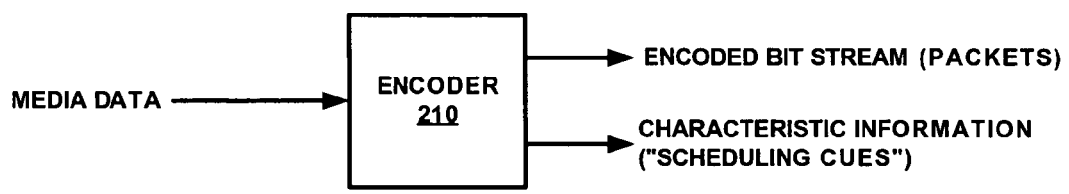
FIG. 2A is a block diagram illustrating the generation of cues for ordering data packets according to one embodiment of the present invention.

FIG. 2A is a block diagram illustrating an encoder 210 that generates cues that can be used to establish an order for sending data packets according to one embodiment of the present invention. According to the present embodiment, when a media object (e.g., a video sequence) is encoded (compressed), an associated set of information is also created. The associated set of information is referred to herein as "scheduling cues." Thus, in the present embodiment, the output of encoder 210 is an encoded bit stream embodied as data packets, and a set of scheduling cues that characterize each data packet in a quantifiable manner. The scheduling cues are used to schedule packet transmission, which will be described in further detail below.

In one embodiment, one or more scheduling cues are associated with each data packet. Alternatively, scheduling cues can be associated with each frame of video data. Also, the example of FIG. 2A shows scheduling cues being generated as data are encoded. Alternatively, scheduling cues can be generated for pre-encoded data or for data that are not encoded, as illustrated in FIG. 2B.

Figure 2B:
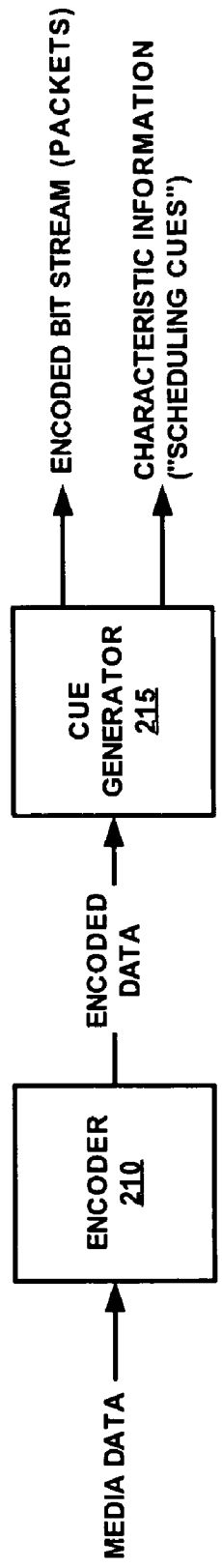
FIG. 2B is a block diagram illustrating the generation of cues for ordering data packets according to another embodiment of the present invention.

In FIG. 2B, encoder 210 encodes media data, and the encoded data are then sent to cue generator 215, which generates the scheduling cues for the pre-encoded data. Encoder 210 can encode the media data in entirety before sending the encoded data to cue generator 215. Alternatively, the encoded data can be streamed to cue generator 215 as the data are encoded. In addition, there may be a storage device or buffer situated between encoder 210 and cue generator 215. In the latter case, encoded data can be sent to the storage device after encoding or while it is being encoded. Cue generator 215 can then retrieve encoded data from the storage device as the data are needed.

In one embodiment, the scheduling cues are stored in the same file as the media data (encoded or otherwise), and as such the scheduling cues can be referred to as a "track." However, the media data and the scheduling cues can be separately stored (as separate files or even in separate storage devices). In general, one or more scheduling cues are uniquely associated with a particular data packet or frame, and various mechanisms can be used to associate the scheduling cues with the appropriate data packet/frame or vice versa.

The scheduling cues can include a variety of information such as, but not limited to:
- the nominal presentation (e.g., display) time for each packet;
- the relative importance of each packet or frame. For a video data packet or frame, this can be measured in terms of the resulting distortion that would be produced in a display if that packet or frame was lost, arrived late, or was not sent;
- coding dependencies in media data (e.g., video data) that are predictively encoded; for example, what packets or frames depend on other packets or frames, what packets correspond to I-frames, P-frames or B-frames, or, for scalable coding, what packets form the base layer and what packets form each enhancement layer, and how many packets or frames depend on any given packet or frame;
- which packets provide error-resilience (e.g., I-slices in compressed video) or redundancy (e.g., forward error correction packets that may be sent to help overcome losses);
- packet information such as: information identifying the beginning and end of each data packet's data in the bit stream; Real-Time Protocol (RTP) header information for each data packet; whether a packet is the last data unit required to decode a media unit; etc.;
- the length of each packet (e.g., in bytes); and/or
- the nominal transmission time of each packet, relative to the start of transmission (when the first data packet was transmitted). For example, the first packet is transmitted at time zero (0), the next packet at time 0+T, the next packet at time 0+2T, and so on. Nominal transmission times may be constant or uniform; however, generally the number of data packets transmitted per unit time varies as a function of the compressed bit rate for each unit of time.

An example of particular interest is one in which the encoded video data includes an I-frame followed by a number of P-frames, where the sequence of P-frames does not include any B-frames. A series of P-frames that does not include any B-frames (or I-frames, for that matter) is referred to herein as "a sequence of contiguous P-frames." As will be discussed further below, the example at hand can be extended to other examples in which other types of frames are included in the sequence. In general, as will be seen, embodiments in accordance with the present invention permit decisions to be made about which frames to send, and which frames not to send, when it is necessary to choose between frames.

Continuing with example above, a sequence of contiguous P-frames may have been intentionally encoded without B-frames. Alternatively, a sequence of contiguous P-frames may have been initially encoded with intervening B-frames, but the B-frames were at some point dropped or discarded as a result of a transcoding operation. In other words, a sequence of contiguous P-frames may have been originally encoded as such or it may be derived from a sequence of P-frames and B-frames.

In addition, while a P-frame may be predictively encoded based on other frames, it may also contain portions which are not predictively encoded based on other frames. For example, conventional P-frames may include intra-coded macroblocks (I-macroblocks), or intra-coded slices (I-slices), or may involve other forms of intra-coding.

Also, a P-frame may be predictively encoded based on one or more other frames. For example, in MPEG-4 Part 10 Advanced Video Coding (AVC), also known as H.264, a P-frame may be predicted based on multiple reference frames.

The sequence of contiguous P-frames can be of any length (e.g., two or more P-frames without any intervening B-frames or I-frames). In some instances, the sequence of contiguous P-frames includes hundreds of P-frames.

Surprisingly, the amount of distortion that would result if a P-frame in a sequence of contiguous P-frames is dropped or discarded is not roughly the same for all P-frames in that sequence. That is, although conventional wisdom is that the effect on quality is approximately the same regardless of which P-frame in a sequence of contiguous P-frames is dropped or discarded, the effect on quality is surprisingly strongly dependent on which P-frame in the sequence is dropped.

According to one embodiment of the present invention, for each P-frame in a sequence of contiguous P-frames, the amount of distortion that would result if the P-frame was not sent or received (e.g., dropped or discarded) is determined in advance. The amount of distortion associated with a particular P-frame can be included in the scheduling cue(s) for the data packet(s) associated with that P-frame.

Instead of including the actual predicted amounts of distortion in the scheduling cues, other information representative of the amount of distortion can be included in the scheduling cues. For example, each P-frame (or the data packet(s) associated therewith) can be given a relative priority or rank based on its effect on distortion.

Thus, in one embodiment, the amount of distortion associated with the absence of each P-frame in a sequence of contiguous P-frames is predicted. Based on the predicted amounts of distortion, one P-frame in the sequence can be judged as being more important than another P-frame in the sequence.

Criteria other than the amount of distortion can be used to rate one P-frame in a sequence of contiguous P-frames as being more important than another P-frame. For instance, the number of other P-frames that depend on (are predicted from) each P-frame can be used to rank P-frames in importance. Listed above are other types of information that can be included in scheduling cues and that can be used to establish a relative importance of P-frames.

Using the scheduling cues, an intelligent decision can be made about which of the P-frames in a sequence of contiguous P-frames to drop or discard during transcoding. Should it be necessary to drop or discard a data packet, or to delay sending a data packet, data packet(s) associated with a P-frame of relatively lesser importance can be readily identified from the scheduling cues. For instance, a P-frame in a sequence of contiguous P-frames that, if dropped or discarded, is predicted to cause less distortion (relative to other P-frames in the sequence) can be dropped or discarded. The process just described can be extended to as many P-frames as necessary in order to satisfy transmission constraints. In this manner, non-scalable data can be scaled with reduced impact on quality.

Conversely, the P-frames that, if dropped or discarded, are predicted to cause more distortion (relative to other P-frames in the sequence) are sent, or sent again if it is judged that perhaps they were not received.

Although the example above pertains to a sequence of contiguous P-frames, the example can be generally extended to a sequence of frames of data in which the frames in the sequence are all of the same type (e.g., all I-frames). Also, the example can be generally extended to a sequence of frames of data in which the frames in the sequence are of different types. In this case, it is still beneficial to be able to accurately distinguish the relative importance of frames of the same type—that is, it is desirable to select a frame to send (or not send) from among a number of frames of the same type, even if those frames of the same type may not be contiguous.

For example, a sequence may contain both I-frames and P-frames. If the I frames are identified to be most important, they will be preserved, and decisions about which frames to send (and which frames to drop or discard) are therefore made among the P-frames in the sequence.

As another example, a sequence may contain I-frames, P-frames, and B-frames. The I-frames may be identified as the most important and may be preserved. The B-frames may be identified as the least important, and all of the B-frames may be discarded. Even so, it may still be necessary to make further decisions about which frames to send (and which frames to drop or discard), and those decisions will be made among the P-frames.

Furthermore, there may be cases where certain P-frames are less important than B-frames, and those P-frames may therefore be discarded before B-frames are discarded. Even more surprising, there may be cases where I-frames are less important than P-frames or B-frames, and therefore an I-frame may be discarded before a P-frame or B-frame is discarded.

In general, according to embodiments of the present invention, for each frame in a sequence of video frames, the amount of distortion predicted to occur if that frame was not sent or received (e.g., dropped or discarded) is determined in advance, and that predicted amount of distortion can be included in the scheduling cue(s) for the data packet(s) associated with that frame. Alternatively, as mentioned above, other information representative of the predicted amount of distortion can be included in the scheduling cues. Based on the predicted amounts of distortion, one frame in the sequence can be judged as being more important than another frame in the sequence. In other cases, it is beneficial to judge one frame as being less important than one or more other frames in the sequence. In other embodiments, as mentioned above, criteria other than the amount of distortion can be included in the scheduling cues to rate one frame in a sequence as being more (or less) important than another frame in the sequence.

In addition, when predicting the distortion that will result if a frame or packet is not received at the receiver, the sender can account for the specific error recovery or error concealment approach that is used by the receiver. Example methods include replacing the missing frame or partial frame with the associated information from a neighboring frame (e.g., the previous frame or a subsequent frame). In addition, the motion between frames may be estimated and a motion-compensated replacement may be applied. This may include a motion-compensated replacement using a previous frame, or a motion-compensated interpolation using both previous and future frames.

In summary, scheduling cues provide a basis for making a reasoned decision about, for example, which data packets or frames should be resent if for some reason they do not arrive at their destination, or which data packets or frames can be skipped over (e.g., not sent) or delayed should it become necessary to resend other data packets or frames. More importantly, using the scheduling cues, a streaming server can make such decisions without intensive computational effort, because much of the relevant information no longer needs to be computed in streaming time (as data are streamed).

Figure 3:
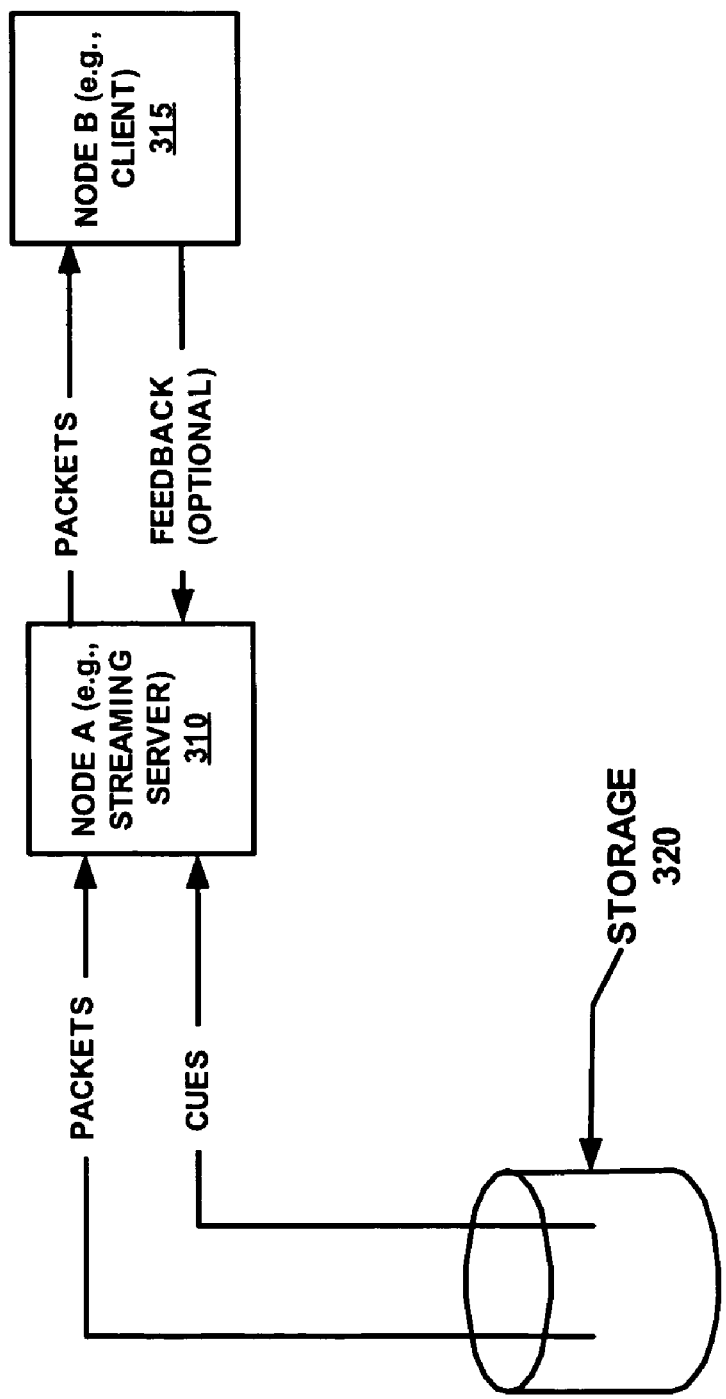
FIG. 3 is a block diagram illustrating a streaming operation between network nodes according to one embodiment of the present invention.

FIG. 3 is a block diagram illustrating a streaming operation between network nodes according to one embodiment of the present invention. The example of FIG. 3 shows a first node (node A 310) and a second node (node B 315) communicating over a network such as network 100 of FIG. 1. As noted, there may be other nodes between node A 310 and node B 315.

In general, node A 310 of FIG. 3 is a device that sends media data to node B 315. Node B 315 can optionally provide feedback about network performance to node A 310. For example, node B 315 can inform node A 310 of the available bandwidth, the average data (frame or packet) loss rate, and/or which data packets or frames have been correctly received. Feedback can also include information such as, but not limited to, data (packet or frame) delivery rates, the time needed to traverse the path to node B 315, delays associated with the path to node B 315, and data (packet or frame) loss patterns (or data packet/frame received patterns). Node A 310 can also receive feedback from other sources, for example, from network management or monitoring devices. Also, or alternatively, node A 310 may have a priori information about network performance based, for example, on earlier streaming sessions or assumptions about network performance.

In the example of FIG. 3, node A 310 is a streaming server and node B 315 is a client device. With reference also to FIGS. 2A and 2B, the output of encoder 210 (e.g., data constituting the encoded media data as well as the scheduling cues) can be stored in a storage element such as storage 320, where it can be accessed by server 310. Storage 320 can be an element separate from server 310 or incorporated into server 310. In the latter case, the output of encoder 210 is provided to server 310, which can store the output of encoder 210 in whole or in part before streaming the data packets/frames to client 315. Alternatively, server 310 can incorporate encoder 210 (e.g., server 310 and encoder 210 are integrated within a single device).

In general, the encoding and streaming operations can overlap or they can occur in series, separated by any amount of time. The encoding and streaming operations can be performed by a single device or by multiple devices. The output of the encoding operation can be stored in whole or in part by the encoding device, by the streaming device, or by a storage element separate from those devices.

In the example of FIG. 3, client 315 requests a particular media object (e.g., a video object) from server 310. Server 310 reads the corresponding compressed bit stream along with the scheduling cues from storage 320. Server 310 uses the scheduling cues to determine the "best" schedule for sending the data packets or frames constituting the compressed bit stream, as described further below (refer to the discussion of FIGS. 5 and 6). The network performance information presented above can also be used when determining the transmission schedule. Server 310 can then send the data packets or frames to the client 315 according to the transmission schedule. As will be seen, the schedule can be revised as frequently as needed or wanted. For video data, for example, more frequent updates can improve the quality of the display at client 315; however, more frequent updates increase the computational load placed on server 310.

Embodiments in accordance with the present invention are well-suited to a variety of different operational scenarios. Within the context of determining a transmission schedule, server 310 can decide which packet or frame to send at the next transmission opportunity, which packets or frames to send at the next multiple transmission opportunities, which packets or frames to discard or not send, and which packets or frames to resend. Server 310 can also decide whether or not to allocate forward error correction (FEC) information among the data packets, and if so, how to allocate the FEC protection across the data packets in order to maximize the expected quality, and how to distribute the FEC information among the data packets (e.g., the FEC information can be distributed among the packets, or certain data packets may be dedicated to carrying the FEC information).

Also, the server 310 can decide whether to switch from the current compressed bit stream to another compressed bit stream that is better suited to the current network performance (e.g., available bandwidth or required error resilience). For example, because of the variety in client devices and the differences in their capabilities (e.g., different memory sizes, screen sizes, processor speeds, etc.), a media object can be encoded in different ways (e.g., different bit rates, different resolutions, etc.). For a given client, a compressed bit stream for a requested media object may be selected according to that client's attributes. However, based on network performance characteristics, server 310 can decide whether to switch to another compressed bit stream for the requested media object.

As mentioned above, server 310 may or may not receive feedback from the client or from other network devices. The feedback can take the form of acknowledgement messages (ACKs) and negative acknowledgement messages (NACKs) on a packet-by-packet basis, or it may be in the form of statistical properties, perhaps specified for a particular window of time (e.g., a 5% packet loss rate over the last 10 seconds). Bandwidth may be measured in terms of the number of packets transmitted, or in terms of the number of bytes transmitted. Server 310 can also act when no feedback is available, or based on assumed or a priori knowledge of network performance.

Figure 5:
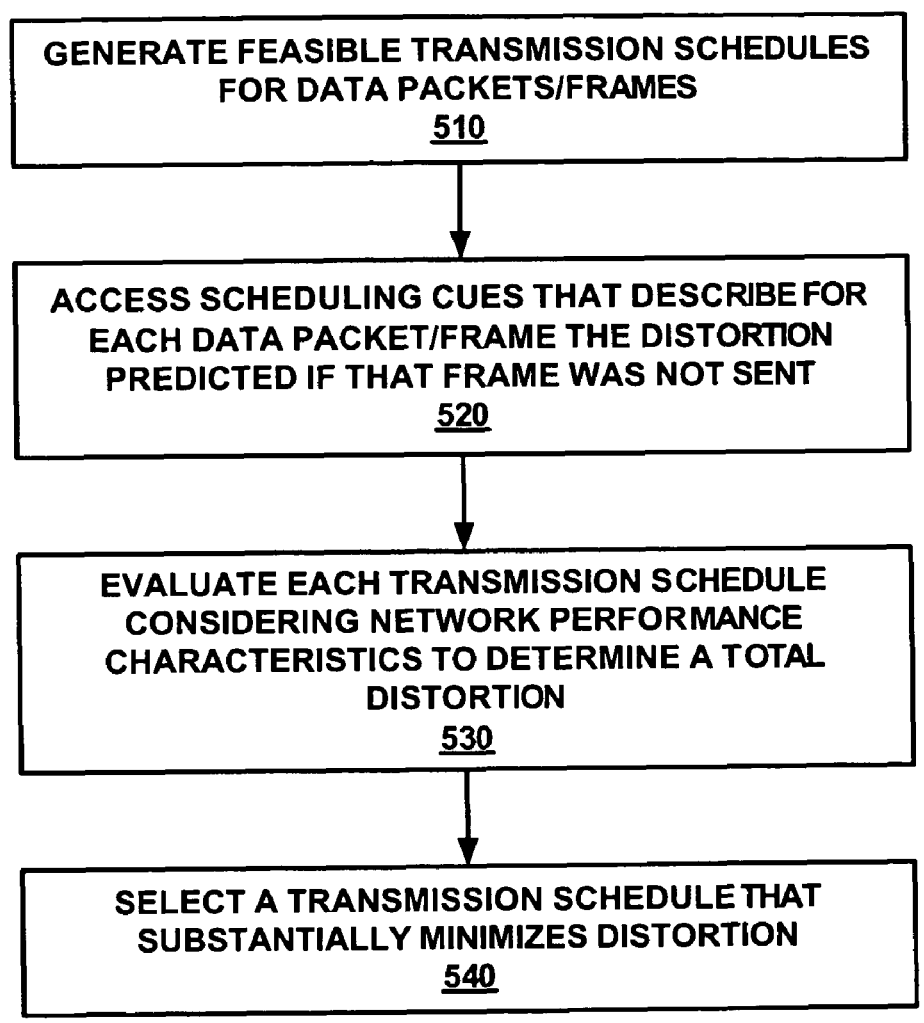
FIG. 5 is a flowchart of a method for scheduling the transmission of data packets according to one embodiment of the present invention.

FIG. 4 is a flowchart 400 of a method for streaming media data according to one embodiment of the present invention. FIG. 5 is a flowchart 500 of a method for scheduling the transmission of data packets/frames according to one embodiment of the present invention. Although specific steps are disclosed in flowcharts 400 and 500, such steps are exemplary. That is, embodiments of the present invention are well-suited to performing various other steps or variations of the steps recited in flowcharts 400 and 500. It is appreciated that the steps in flowcharts 400 and 500 may be performed in an order different than presented, and that not all of the steps in flowcharts 400 and 500 may be performed. All of, or a portion of, the methods described by flowcharts 400 and 500 may be implemented using computer-readable and computer-executable instructions which reside, for example, in computer-usable media of a computer system. Generally, flowcharts 400 and 500 are implemented by server 310 of FIG. 3. Alternatively, the flowcharts may be implemented by node B 315 of FIG. 3, or by a mid-network monitoring node, edge server or proxy, with the selected transmission schedule sent to server 310 for streaming.

Referring first to FIG. 4, in step 410, data embodied as a plurality of data packets is accessed. In one embodiment, the data packets are associated with video data. In one such embodiment, the data packets are associated with a sequence of frames of data. A data packet can include data for one or more frames, or the data constituting a frame may require more than one data packet.

In step 420, scheduling cues ("first information" or "data-related information") that quantify some characteristic of each data packet or frame in the plurality of data packets are also accessed. A scheduling cue can include, but is not limited to, information identifying the beginning and end of a data packet's data; header information for a data packet; information identifying the length of a data packet; information identifying a transmission time of a data packet; information identifying nominal presentation time for a data packet; information quantifying for a data packet or frame an amount of distortion predicted to occur should that data packet or frame not be sent or received; coding dependencies between the data packets or frames; information identifying for a data packet or frame how many data packets or frames are dependent on that data packet; information identifying which data packets provide error resiliency; information identifying which data packets provide redundancy; and information identifying a deadline for delivering a data packet or frame. In general, data-related information pertains to information associated with the data in a data packet or frame, but does no include information about the type of frame or information about where the data packet or frame is positioned in a sequence of data packets or frames.

In a sequence of frames that includes either different types of frames (e.g., I-frames, P-frames, and/or B-frames) or frames that are all of the same frame type (e.g., all P-frames), the scheduling cues provide information that establishes the relative importance of each frame in the sequence. As such, the scheduling cues provide information that establishes the relative importance of each frame of a particular frame type relative to other frames of the same frame type. For instance, the scheduling cues can be used to rate one P-frame as being more important than another P-frame. This is a very useful ability because all frames of the same frame type are typically considered to be of roughly equal importance. Thus, the ability to accurately distinguish between the importance of different frames of the same (or different) frame type is very useful when it comes to, for example, determining an order for sending data packets or frames or for deciding which frames or data packets are to be sent.

In step 430, the scheduling cues can be used to determine an order for sending the data packets or frames over a network. In one embodiment, network performance characteristics ("second information" or "network-related information") are also used to determine the order for sending data packets. Network performance characteristics include, but are not limited to, bandwidth available along a path in the network; bottleneck link capacity along the path; data (e.g., data packet or frame) delivery rate; data (e.g., data packet or frame) loss rate (also loss histograms); data packet received pattern; data packet loss pattern (also loss histograms); information identifying which of the data packets or frames was received at a node along the path; information identifying which of the data packets or frames did not arrive at a node along the path; information quantifying time needed to traverse the path; and information quantifying delays associated with the path. In another embodiment, a delivery deadline is identified for each packet or frame, and this information is also used to determine the order for sending data packets/frames.

The scheduling cues can be used to determine whether or not to send a particular data packet or frame. The scheduling cues can also be used to determine whether to resend a particular data packet or frame. The scheduling cues provide a basis for identifying the data packets or frames of relatively high importance (and conversely, the data packets/frames of relatively low importance). Frames of higher importance, or the data packet(s) associated with frames of higher importance can be sent or resent, while frames of lower importance, or the data packet(s) associated with frames of lower importance, can be dropped or discarded if necessary.

Flowchart 500 of FIG. 5 provides a more detailed view of a method for determining a schedule for transmitting data packets according to one embodiment of the present invention, and is discussed with reference also to FIG. 6.

Flowchart 500 is described in the context of data packets. A data packet can include data for one or more frames, or the data constituting a frame may require more than one data packet. The discussion of flowchart 500 is readily extended from data packets to frames. For instance, where there is a one-to-one correspondence between a data packet and a frame, the distortion associated with the data packet not being sent or received is equivalent to the distortion associated with the frame not being sent or received. Where a data packet includes data for one or more frames, the distortion associated with the data packet not being sent or received is equivalent to the distortion associated with each of those frames not being sent or received (e.g., the sum of the distortions associated with all frames contained in the data packet). Where a frame requires multiple data packets, the distortion associated with each of those data packets not being sent or received is equivalent to the distortion associated with the frame not being sent or received, or with the distortion associated with the specific portion of the frame contained in the data packet that is not being sent or received. In the latter situation, decisions about whether to send a data packet, the order for sending the data packets, and other such decisions can be made on a frame-by-frame basis or a packet-by-packet basis.

In step 510 of FIG. 5, feasible transmission schedules 615 are generated using the list of data packets 618 to be scheduled as well as information that describes the current state and constraints 610 of the delivery process. The current state and constraints information 610 can include network performance characteristics such as those mentioned above (e.g., bandwidth, packet loss rate, delays, etc.). The current state and constraints information 610 can also include information such as delivery deadlines associated with each of the data packets being scheduled.

The list of data packets 618 can include any data packets not yet transmitted, any data packets transmitted but known to be lost during transmission, and any data packets transmitted but whose status is unknown. The list of data packets 618 to be scheduled may include all data packets associated with a media object, or they may include only a subset of all those data packets. In the latter instance, the delivery of each subset of data packets can be scheduled in turn. In either instance, the transmission schedule can be revised at a later time. In general, the data packets of primary interest are data packets that have been recently lost, data packets recently transmitted but their status is unknown (e.g., it is not known whether or not they were correctly delivered), and data packets yet to be delivered but need to be delivered in the relatively near future (e.g., as measured against their delivery deadline).

In step 520, scheduling cues 624 are accessed. In one embodiment, the scheduling cues 624 quantify, for each data packet, an effect that would result if that data packet was not sent or received. For a video data packet, the amount of distortion expected to occur if that data packet was not sent or received can be specified by the scheduling cues 624.

The distortion associated with each data packet can be a measured distortion or an estimated distortion. In one embodiment, the measured distortion associated with losing a particular data packet is computed by, in essence, dropping that data packet from the bit stream and computing the resulting distortion produced when decoding the remaining data packets. This measurement can be performed as the media are encoded (e.g., by encoder 210 of FIGS. 2A and 2B). For pre-encoded data, the data packet can be dropped from the encoded (compressed) bit stream, the remainder of the packets can be decoded, and the resulting distortion can be computed. In one embodiment, estimated distortion is accomplished by extracting information from the encoded bit stream that provides an indication of the distortion that may result. For example, for video data that has large motion vectors, a lost data packet will likely lead to much larger distortion than video data that has small or zero-value motion vectors. Measured distortion is more accurate than estimated distortion; however, measured distortion is more complex to compute.

For each sequence of data packets in a bit stream (e.g., for each list of data packets 618), a table can be generated that includes information (e.g., scheduling cues 624) about the data packets in the sequence. For each sequence, there may be more than one of such tables. For example, the distortion that results from the loss of a single data packet can be included in one of the tables. For N data packets, the table would be of size N×1, where an entry j in the table describes the distortion that would result if packet j is lost.

Another table can include the distortion that results for the loss of any two data packets. For N packets, the table would be of size N×N, where an entry (j,k) describes the distortion that result if packets j and k are both lost (packets j and k do not have to be consecutive packets in the sequence). Tables can be similarly derived for the loss of more than two packets. In general, for N packets, these tables would be of size $N^M$, where M is the number of data packets assumed to be lost.

However, smaller and less complex tables can be used while achieving similar performance. For example, if two lost packets are sufficiently far apart from each other in the bit stream, then they will have an independent effect on the distortion. Also, for example, in a sequence that includes a number of P-frames, if one P-frame does not depend on another P-frame (e.g., they may both depend on the same I-frame, or they may each depend on independent P-frames), then they will have an independent effect on the distortion. Therefore, the tables do not need to include information for combinations of lost packets that have an independent effect on distortion. For example, if all N video frames are encoded as I-frames, then they can be treated as independently effecting distortion, and a table of size N×1 would be generally sufficient. Also, the loss of a B-frame will not afflict other frames, and so a table of size N×1 is sufficient for B-frames.

Also, if video data are encoded with periodic I-frames (e.g., every 15th frame is an I-frame), then each group of pictures (GOP) can be treated separately. For example, consider a video having a length of N frames, and for simplicity of discussion, assume that each frame is encoded into a single data packet. For a GOP of 15 frames (data packets), for example, the video would be composed of N/15 GOPs. Each GOP can have its own table of distortion information. For the case in which two data packets are assumed lost, each GOP table would be of size 15×15. Thus, there would be N/15 tables, each of size 15×15, for a total size of N×15. Without exploiting the independence of each GOP, a table of size N×N would be needed for the case in which two packets are assumed to be lost.

If a video is encoded with partial intra-coding of each frame, as opposed to periodic I-frames, losses spaced sufficiently far apart in time can also be approximated as independent losses.

Also, consider an example in which the video includes a GOP of 15 frames that is independent of a following GOP. The GOP may have frames in the following order: I1, B2, B3, B4, P5, B6, B7, B8, P9, B10, B11, B12, P13, B14, B15. In this example, all 15 frames depend on the first I-frame (I1), 14 frames depend on P5, 10 frames depend on frame P9, six frames depend on frame P13, and only one frame depends on each B-frame. The distortion tables for the example GOP may include a 15×1 table for all frames; a 15×1 table for all frames and larger dimension tables for the I-frames and P-frames (e.g., tables assuming a loss of two packets, three packets, and so on); or an 11×1 table for the eleven B-frames, with larger dimension tables for the I-frames and P-frames.

The sizes of tables can also be reduced by including information in the tables for only a subset of the data packets instead of for every packet. For example, the tables may include only sub-sampled information (e.g., information for every tenth packet) or information only for relatively important packets (e.g., those related to I-frames or P-frames). Alternatively, the tables may include only information carefully selected based on the relative importance of each packet (e.g., the packets that if lost result in the largest distortion, or that have pronounced rate-distortion tradeoffs that can be exploited).

While the above discussion has focused on MPEG video encoding with the popular I, P and B-frame encoding modes, embodiments of the present invention also apply to other forms of encoding such as scalable encoding where once again the compressed data consist of different subsets of data with different priorities, coding dependencies and associated distortions.

Figure 6:
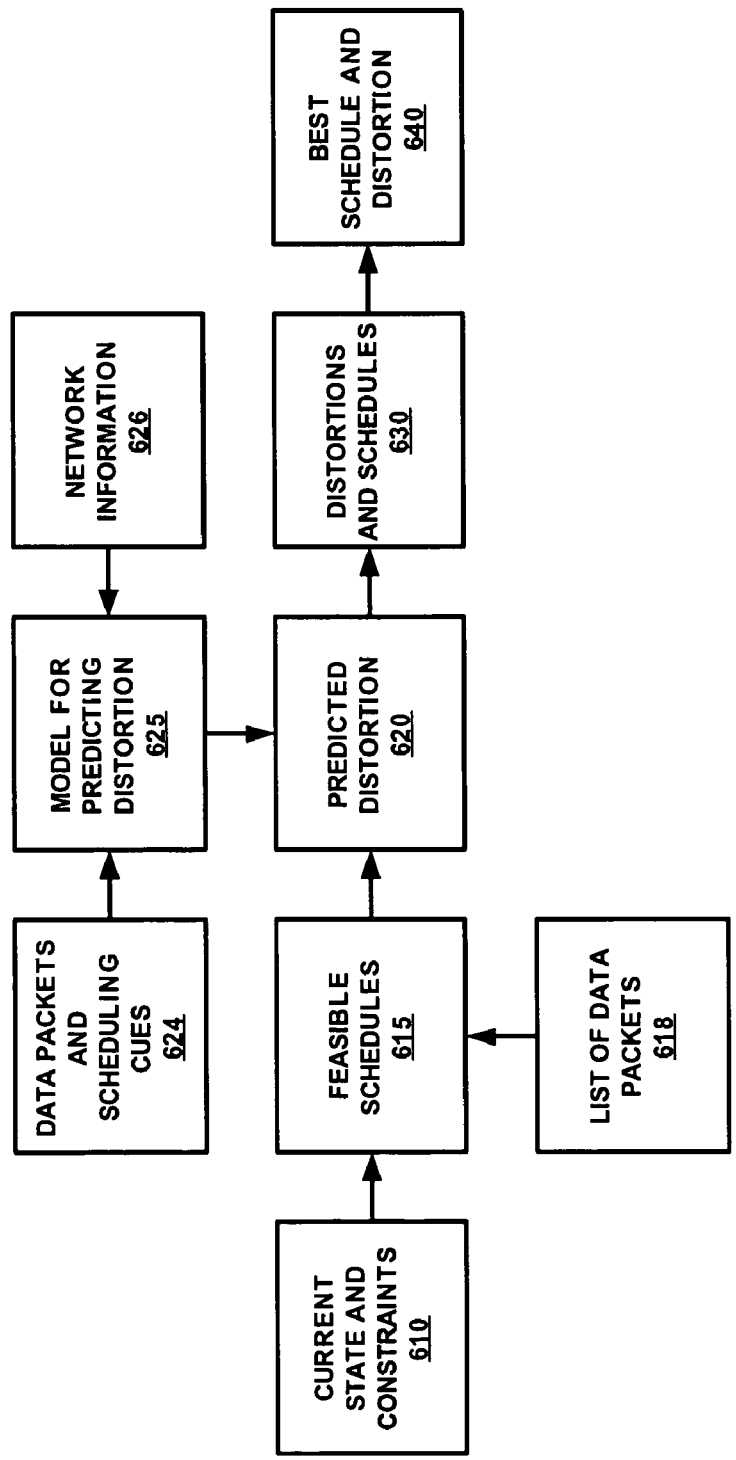
FIG. 6 is a flow diagram of a process for scheduling the transmission of data packets according to one embodiment of the present invention.

Continuing with reference to FIGS. 5 and 6, in step 530, using the encoded bit stream along with the scheduling cue(s) 624, and also using information 626 that characterizes network performance along the delivery path, each of the transmission schedules is evaluated using a model 625 to predict the effect of each of the transmission schedules on a selected, quantifiable parameter. In one embodiment, model 625 predicts the distortion 620 for each schedule. For example, the distortion assuming loss of a single data packet from the plurality of data packets can be determined. Alternatively, the distortion assuming loss of data packets in different numbers and combinations can be determined. In one embodiment, the predicted distortions for each of the feasible schedules can be stored (630).

Note that the predicted distortion 620 can be a single number corresponding to the expected distortion, or it may be a distribution of expected distortions, or something in between (e.g., expected distortions with a tolerance band corresponding to, for example, one standard deviation). Alternatively, some form of cumulative distribution function for the distortion can be determined.

In step 540, a transmission schedule that minimizes (or nearly minimizes) the total effect (e.g., distortion) is selected (the best schedule 640). Alternatively, a schedule that satisfies a specified threshold can be selected. For example, an acceptable level of distortion can be specified, and a schedule that does not exceed that level can be selected.

The data packets, or some portion thereof, can then be transmitted according to the selected schedule. The steps above can be repeated to determine a newer or updated schedule, even as the data packets are being sent under the existing schedule. For example, a new schedule can be determined for each data packet, for every group of N packets, for every video group of pictures, or every N seconds. A new schedule can also be determined in response to some sort of triggering event. For example, feedback from the client device (or any other downstream node) might indicate that a particular data packet did not arrive. A new schedule can be determined when such feedback is received (the new schedule may include resending the data packet). Also, updated network performance characteristics may be received, and a new schedule accounting for any change in network performance can be determined as a result of receiving such information. A new schedule can also be determined if, for example, a particular data packet is, for some reason, not sent early enough for it to be received by its delivery deadline (in this case, the new schedule may choose not to send that data packet since, if it was sent, it would arrive late). As another example, if the updated network performance characteristics indicate that the available bandwidth has decreased, a new schedule can be created which attempts to minimize the expected distortion subject to the bandwidth constraint (the new schedule may include transmitting a smaller number of packets to meet the bandwidth constraint, where the particular selection of packets is chosen to minimize the expected distortion).

The above discussion is illustrated by way of a simplified example in which five data packets are to be sent, numbered one through five. The distortion associated with losing packet 1 is D1, for packet 2 the distortion is D2, and so on. The distortions D1 through D5 are included in the scheduling cue 624 associated with packets 1 through 5, respectively. A simplified model 625 for predicting distortion can entail summing the distortions that result for each data packet that is lost. Thus, to estimate the distortion that would result for any pattern of received or lost data packets, the distortions for each of the lost packets is summed. For example, if data packets 3 and 5 are lost, then the predicted distortion would be D3 plus D5. The best schedule is the one that results in the smallest predicted distortion for the predicted pattern of packet losses (based on network performance characteristics).

Figure 7:
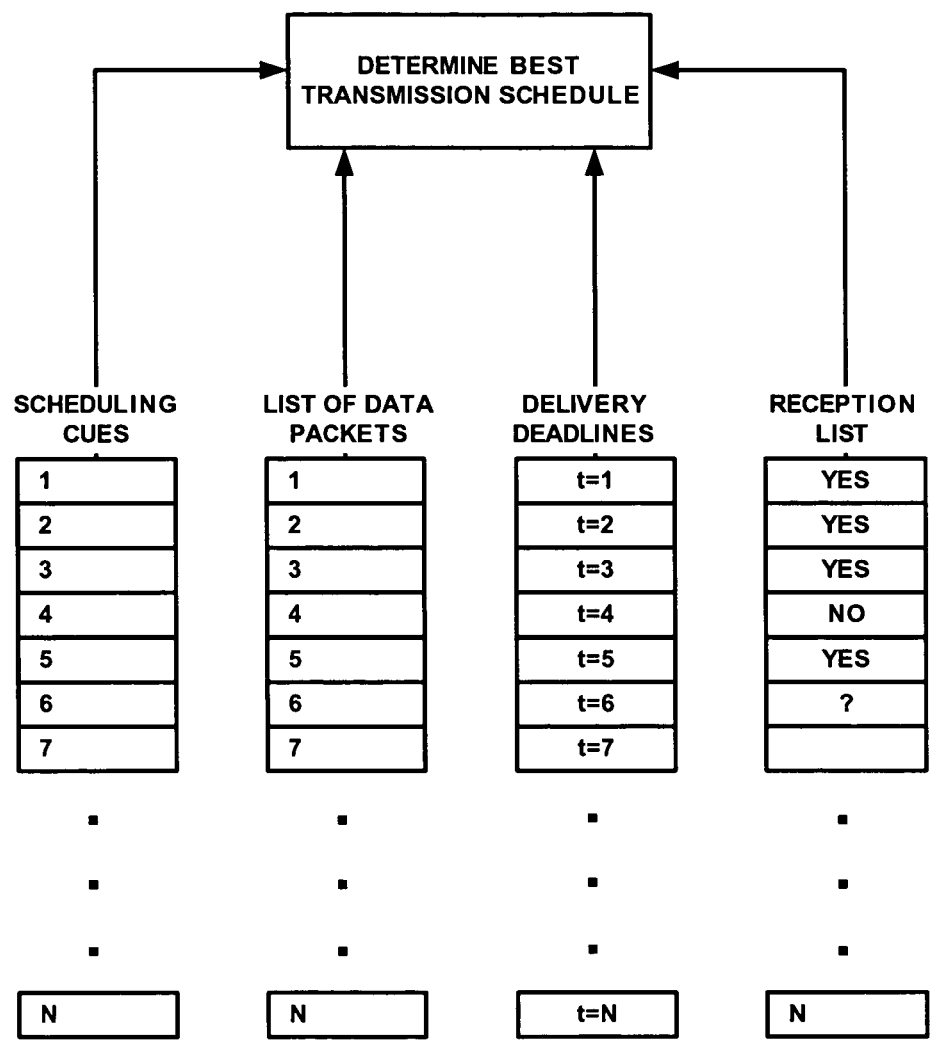
FIG. 7 illustrates an example of a process for scheduling the transmission of data packets according to one embodiment of the present invention.

FIG. 7 illustrates another example of a process for scheduling the transmission of data packets according to one embodiment of the present invention. The data packets are listed in a feasible transmission schedule. The feasible transmission schedule may be the best schedule determined in a preceding iteration. Using the list of data packets, the associated delivery deadline for each data packet, the scheduling cues, and any information received about the reception, loss or late delivery of data packets, a transmission schedule can be determined for those packets remaining to be sent as well as any packets already sent but perhaps not correctly received.

FIG. 7 is described in the context of data packets. As discussed above in conjunction with FIG. 5, a data packet can include data for one or more frames, or the data constituting a frame may require more than one data packet. Where a frame requires multiple data packets, instead of treating the data packets on a packet-by-packet basis, the data packets associated with a frame can also be treated as a group (the data packets can be treated on a frame-by-frame basis).

Using the list of data packets, the associated delivery deadline for each data packet, the scheduling cues, and any information received about the reception, loss or late delivery of data packets, a transmission schedule can be determined for those packets remaining to be sent as well as any packets already sent but perhaps not correctly received.

In the example of FIG. 7, packets 1 through 6 have been previously transmitted and processing of packet 7 is next. Feedback information (e.g., from the client) indicates that packets 1, 2, 3 and 5 have been correctly received and packet 4 was not received. Packet 6 has been sent but no information is available as to whether or not it has been received. Based on this information, and also based on the scheduling cues, the streaming server (e.g., server 310 of FIG. 3) can, for example, decide whether to resend packet 4 or to send packet 7 at the next transmission opportunity. More importantly, the streaming server can make this decision without the use of complex algorithms that require substantial computational effort. For instance, to select between packet 4 and packet 7, the streaming server may simply select the packet having the greatest impact on distortion, based on the quantified distortion information provided by the scheduling cues. Thus, significant performance gains in packet scheduling can be achieved without invoking complex optimization techniques.

Figure 8:
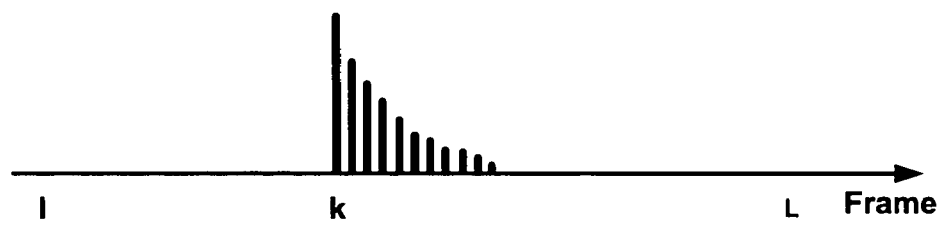
FIG. 8 is a graph showing distortion resulting from the loss of an isolated frame according to one embodiment of the present invention.

FIG. 8 is a graph showing distortion in mean-squared error (MSE) resulting from the loss of an isolated frame k according to one embodiment of the present invention. For a video sequence with L frames, there are L possible isolated losses, resulting in a linear storage cost of L numbers. FIG. 8 illustrates the distortion D(k) caused by losing frame k.

To model the distortion caused by an arbitrary loss pattern given only D(1) to D(L), a zero-th order distortion chain model, $DC^0$, can be employed, where zero-th order describes that no memory is assumed and that the distortion that results for each lost packet is independent of any prior lost packets. This model is accurate when losses are spaced far apart (e.g., when loss rate is low). When N frames $K=(k_1, k_2, \ldots, k_N)$ are lost, the predicted total distortion is simply given by:

$$\tilde{D}(K) = \sum_{i=1}^{N} D(k_i). \quad (1)$$

As mentioned earlier, the best transmission schedule for the packets of a video stream subject to a transmission bandwidth constraint is sought. This problem can be formalized as follows. Let W be a window of packets considered for transmission and let R* be the bandwidth constraint, measured either in bits or number of packets. A decision is sought on the subset of packets K∈W that should not be transmitted in order to satisfy the bandwidth constraint. Let R(W\K) be the rate associated with the packets from W that will be transmitted, where "\" denotes the operator "set difference." Thus, the subset K, such that the total distortion due to dropping K is minimized while meeting the bandwidth constraint is given, by:

$$K^* = \underset{K \in W: R(W\backslash K) \leq R^*}{\operatorname{argmin}} \tilde{D}(K). \quad (2)$$

Now, consider first solving equation (2) in the case when the transmission bandwidth R* is expressed as number of packets. Assume that R*=k, i.e., k packets are to be dropped from W. Then K* is found by sorting the distortions for each packet in increasing order, and selecting the first k packets (those with the K smallest associated distortions). In addition, if the problem changes to determine the best k+1 packets to drop, the solution then directly builds on the preceding solution. Specifically, the selection of the best subset of k packets to drop is contained in the best subset of k+1 packets to drop. In contrast, an approach that does not provide this property would have to perform a completely new search for every k. The optimal schedule can therefore be obtained with very little computation.

Next, consider the alternative case when R* is measured in bits. The integer programming required to obtain the exact optimal solution is difficult to compute. A practical approximation that can be employed is to drop packets that individually cause the least distortion per bit. Specifically, a packet j∈W is associated with a utility in terms of distortion per bit of $\lambda_j=D(j)/R(j)$. K* is obtained by sorting the packets in W in decreasing λ, and then transmitting as many packets as possible starting from the highest utility (distortion-per-bit) packet. In this manner, once again an embedded search strategy is achieved with the associated low complexity benefits.

Figure 9:
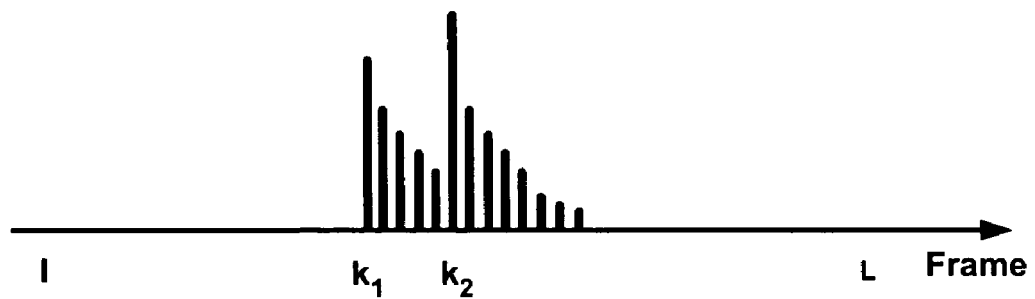
FIG. 9 is a graph showing distortion resulting from the loss of two frames according to one embodiment of the present invention.

FIG. 9 is a graph showing distortion in MSE resulting from the loss of two frames $k_1$ and $k_2$ according to one embodiment of the present invention. If $D(k_1, k_2)$ was stored for every possible pair $\{k_1, k_2\}$, then the total storage cost would be quadratic in L. However, since the distortion coupling between dropped packets decreases as the distance between the packets increases, one practical simplification is to assume $D(k_1, k_2)=D(k_1)+D(k_2)$ for $|k_1-k_2|>M$, where M depends on the compression. For example, for a 15-frame GOP, M is at most the number of packets in the GOP. This approximation reduces the required storage and computation for distortion information from $L^2$ to L×M.

The distortion for an arbitrary loss pattern can be estimated using a number of approaches. For example, the distortion can be estimated using a first-order distortion chain, $DC^1$, where the distortion for a lost packet now depends on the last lost packet (memory of one). Specifically, for $k_1 < k_2 < \ldots < k_N$, $$\tilde{D}(K) = D(k_1, k_2) + \sum_{i=2}^{N-1} \{D(k_i, k_{i+1}) - D(k_i)\}. \quad (3)$$

Searching for a packet schedule using the above distortion estimate can be expensive computationally due to the interdependencies between lost packets. This complexity can be reduced through a number of approaches. For example, an iterative descent algorithm can be employed, in which the objective function $\tilde{D}(K)$ is minimized one variable at a time while the other variables are kept constant, until convergence. In particular, consider first the case when R* is expressed in number of packets and assume that R*=m. Then, at iteration n, for n=1, 2, . . . , the individual entries of a drop pattern $K=(k_1, \ldots, k_m)$ is computed using $$k_j^{(n)} = \underset{k_j \in W_j^{(n)}}{\operatorname{argmin}} \tilde{D}(K), \quad (4)$$

for j=1, . . . , m, where the sets $W_j^{(n)}=\{k_{j-1}^{(n)}+1, \ldots, k_{j+1}^{(n-1)}-1\}$. In other words, starting with a reasonable initial solution for K, at each iteration the subset of selected packets K is perturbed in order to find a subset that produces reduced distortion. At each iteration a subset with less or equal distortion is found, and therefore the algorithm is guaranteed to converge, though not necessarily to a global optimum. The case when R* is measured in bits can be solved using a similar gradient descent algorithm as above.

The above discussion identified a number of methods for predicting the total distortion that would result from losing an arbitrary set of packets, which range from tables which explicitly contain the distortion for different packet loss patterns, to potentially smaller tables and associated algorithms for predicting the distortion for different packet loss patterns. In addition, other approaches for predicting the distortion can also be incorporated in module 625 of FIG. 6.

In summary, in its various embodiments, the present invention provides methods and systems for streaming media based on the use of scheduling cues. The scheduling cues can be used by a streaming server to prioritize data packets. In a situation that involves a sequence of the same frame type (only P-frames, for example), the scheduling cues provide a basis for choosing which data packet(s) should or should not be discarded or dropped, or sent or resent.

The streaming server can use the scheduling cues to determine a packet transmission schedule that may maximize quality (e.g., reduce distortion) at a receiver, also considering information such as network performance and delivery deadlines. Without significantly increasing complexity or computational effort, embodiments in accordance with the present invention result in a performance gain comparable to performance gains realized with much more complex techniques. The ability to select or discard certain frames from a group of frames using scheduling cues to maximize the quality at the receiver leads to significant gains in performance.

Embodiments of the present invention are thus described. While the present invention has been described in particular embodiments, it should be appreciated that the present invention should not be construed as limited by such embodiments, but rather construed according to the following claims.

What is claimed is:

1. A method of streaming data, said method comprising:
   accessing data-related information at a streaming server that quantifies a characteristic associated with a frame in a sequence comprising a plurality of frames of video data in addition to information that identifies frame type and in addition to information identifying the position of said frame in said sequence, said data-related information comprising information quantifying for said frame an amount of distortion predicted to occur if said frame not be sent or received, wherein said data-related information establishes a relative importance of frames in said plurality of frames, wherein each of said frames in said plurality of frames is given a priority rank as to each other based on how many of said plurality of frames are dependent on said each of said frames; and
   using said data-related information at said streaming server to make a decision associated with transmission of said frames, wherein said decision comprises at least one of an error concealment approach and a motion compensation approach, said error concealment approach comprising replacing a missing frame or partial frame with associated information from a neighboring frame, said motion compensation approach comprising estimating a motion between said frames and applying a motion-compensated replacement using a previous frame or a motion-compensated interpolation using both previous and future frames.

2. The method of claim 1 wherein said decision comprises determining whether to send said frame.

3. The method of claim 1 wherein said decision comprises determining an order for sending said plurality of frames.

4. The method of claim 1 wherein said plurality of frames comprises frames of different frame types.

5. The method of claim 1 wherein said plurality of frames comprises frames of the same frame type.

6. The method of claim 1 wherein said data-related information also comprises additional data-related information selected from the group consisting of: information identifying the length of a data packet; coding dependencies between frames of said plurality of frames; information identifying for said frame how many of said plurality of frames are dependent on said frame; information identifying which of said plurality of frames provides error resiliency; and information identifying a deadline for delivering said frame.

7. The method of claim 1 further comprising:
   accessing network-related information that characterizes network performance; and
   using said network-related information with said data-related information to make said decision.

8. The method of claim 7 wherein said network-related information is selected from the group consisting of: bandwidth available along a path in said network; bottleneck link capacity along said path; data delivery rate; data loss rate; data packet received pattern; data packet loss pattern; information identifying which of said plurality of frames were received at a node along said path; information identifying which of said plurality of frames did not arrive at a node along said path; information quantifying time needed to traverse said path; and information quantifying delays associated with said path.

9. The method of claim 1 wherein said plurality of frames comprise data that are predictively encoded.

10. The method of claim 1 wherein said plurality of frames are encoded using an encoding scheme selected from the group consisting of a Moving Pictures Experts Group-1 encoding scheme, a Moving Pictures Experts Group-2 encoding scheme, a Moving Pictures Experts Group-4 encoding scheme, an H.261 encoding scheme, an H.262 encoding scheme, an H.263 encoding scheme, and an H.264 encoding scheme.

11. The method of claim 1 wherein said frame comprises a plurality of data packets, wherein said data-related information is provided for one or more of said plurality of data packets.

12. The method of claim 11 wherein said decision comprises determining whether to send a data packet.

13. The method of claim 11 wherein said decision comprises determining an order for sending said plurality of data packets.

14. A method of transmitting frames of video data, said method comprising:
    receiving a group of frames at a streaming server, said group of frames comprising a plurality of frames of the same frame type;
    receiving data-related information at said streaming server that quantifies a characteristic associated with frames in said plurality of frames in addition to information identifying the order of said frames, said data-related information comprising information quantifying for said frame an amount of distortion predicted to occur if said frame not be sent or received, wherein said data-related information establishes a relative importance of frames in said plurality of frames, wherein each of said frames in said plurality of frames is given a priority rank as to each other based on how many of said plurality of frames are dependent on said each of said frames; and
    using said data-related information at said streaming server to make a decision associated with said transmitting, wherein said decision comprises at least one of an error concealment approach and a motion compensation approach, said error concealment approach comprising replacing a missing frame or partial frame with associated information from a neighboring frame, said motion compensation approach comprising estimating a motion between said frames and applying a motion-compensated replacement using a previous frame or a motion-compensated interpolation using both previous and future frames.

15. The method of claim 14 wherein said decision comprises determining which of said group of frames to transmit and which of said group of frames to discard.

16. The method of claim 14 further wherein said decision comprises determining an order for sending said group of frames.

17. The method of claim 14 wherein said group of frames further comprises a plurality of frames of different frame types.

18. The method of claim 14 wherein said data-related information also comprises additional data-related information selected from the group consisting of: information identifying the length of a data packet; coding dependencies between frames of said group of frames; information identifying for said frame how many of said group of frames are dependent on said frame; information identifying which of said group of frames provides error resiliency; and information identifying a deadline for delivering said frame.

19. The method of claim 14 further comprising:
accessing network-related information that characterizes network performance; and
using said network-related information with said data-related information to make said decision.

20. The method of claim 19 wherein said network-related information is selected from the group consisting of: bandwidth available along a path in said network; bottleneck link capacity along said path; data delivery rate; data loss rate; data packet received pattern; data packet loss pattern; information identifying which of said frames in said plurality of frames was received at a node along said path; information identifying which of said frames in said plurality of frames did not arrive at a node along said path; information identifying which of said frames in said group of frames was received at a node along said path; information identifying which of said frames in said group of frames did not arrive at a node along said path; information quantifying time needed to traverse said path; and information quantifying delays associated with said path.

21. The method of claim 14 wherein said frames comprise data that are predictively encoded.

22. The method of claim 14 wherein said frames are encoded using an encoding scheme selected from the group consisting of a Moving Pictures Experts Group-1 encoding scheme, a Moving Pictures Experts Group-2 encoding scheme, a Moving Pictures Experts Group-4 encoding scheme, an H.261 encoding scheme, an H.262 encoding scheme, an H.263 encoding scheme, and an H.264 encoding scheme.

23. A system for streaming data in a network, said system comprising:
a streaming element for streaming a plurality of frames of video data over said network, wherein data-related information that quantifies a characteristic of a frame in said plurality of frames is used to make a decision associated with transmission of said plurality of frames in addition to information that identifies said frame by frame type and in addition to information that identifies the order of said plurality of frames, said data-related information comprising information quantifying for said frame an amount of distortion predicted to occur if said frame not be sent or received, wherein said data-related information establishes a relative importance of frames in said plurality of frames, wherein each of said frames in said plurality of frames is given a priority rank as to each other based on how many of said plurality of frames are dependent on said each of said frames, wherein said decision comprises at least one of an error concealment approach and a motion compensation approach, said error concealment approach comprising replacing a missing frame or partial frame with associated information from a neighboring frame, said motion compensation approach comprising estimating a motion between said frames and applying a motion-compensated replacement using a previous frame or a motion-compensated interpolation using both previous and future frames.

24. The system of claim 23 wherein said decision comprises determining whether to send said frame.

25. The system of claim 23 wherein said decision comprises determining an order for sending said plurality of frames.

26. The system of claim 23 further comprising:
a storage element coupled to said streaming element, said storage element for storing said video data and for storing said data-related information; and
an encoder element coupled to said storage element, said encoder element for encoding said video data and for generating said data-related information.

27. The system of claim 23 further comprising:
a storage element coupled to said streaming element, said storage element for storing said video data and for storing said data-related information;
an encoder element coupled to said storage element, said encoder element for encoding said video data; and
a cue generator element coupled to said storage element, said cue generator element for generating said data-related information.

28. The system of claim 23 wherein said data-related information also comprises additional data-related information selected from the group consisting of: information identifying the length of a data packet; coding dependencies between frames of said plurality of frames; information identifying for said frame how many of said plurality of frames are dependent on said frame; information identifying which of said plurality of frames provides error resiliency; and information identifying a deadline for delivering said frame.

29. The system of claim 23 wherein network-related information that characterizes network performance is used with said data-related information to make said decision.

30. The system of claim 29 wherein said network-related information is selected from the group consisting of: bandwidth available along a path in said network; bottleneck link capacity along said path; data delivery rate; data loss rate; data packet received pattern; data packet loss pattern; information identifying which of said plurality of frames were received at a node along said path; information identifying which of said plurality of frames did not arrive at a node along said path; information quantifying time needed to traverse said path; and information quantifying delays associated with said path.

31. The system of claim 23 wherein said frames comprise data that are predictively encoded.

32. The system of claim 23 wherein said frames are encoded using an encoding scheme selected from the group consisting of a Moving Pictures Experts Group-1 encoding scheme, a Moving Pictures Experts Group-2 encoding scheme, a Moving Pictures Experts Group-4 encoding scheme, an H.261 encoding scheme, an H.262 encoding scheme, an H.263 encoding scheme, and an H.264 encoding scheme.

* * * * *